(12) United States Patent
Piirainen

(10) Patent No.: US 7,339,918 B2
(45) Date of Patent: Mar. 4, 2008

(54) METHOD FOR IMPROVING THE QUALITY OF DATA TRANSMISSION

(75) Inventor: Olli Piirainen, Oulu (FI)

(73) Assignee: Nokia Corporation, Espoo (FI)

( * ) Notice: Subject to any disclaimer, the term of this patent is extended or adjusted under 35 U.S.C. 154(b) by 802 days.

(21) Appl. No.: 10/080,509

(22) Filed: Feb. 25, 2002

(65) Prior Publication Data

US 2002/0141363 A1  Oct. 3, 2002

Related U.S. Application Data

(63) Continuation of application No. PCT/FI01/00606, filed on Jun. 25, 2001.

(30) Foreign Application Priority Data

Jun. 26, 2000  (FI) .................................. 20001513

(51) Int. Cl.
H04B 7/212 (2006.01)

(52) U.S. Cl. ...................... 370/347; 370/332; 370/350; 370/442

(58) Field of Classification Search ........ 370/347–350, 370/442
See application file for complete search history.

(56) References Cited

U.S. PATENT DOCUMENTS

| | | | | |
|---|---|---|---|---|
| 4,965,536 A | * | 10/1990 | Yoshida ....................... | 332/103 |
| 5,140,627 A | * | 8/1992 | Dahlin ........................ | 455/436 |
| 5,566,191 A | | 10/1996 | Ohnishi et al. | |
| 5,802,076 A | * | 9/1998 | Weigand et al. ............. | 714/747 |
| 5,838,742 A | * | 11/1998 | Abu-Dayya ................. | 375/347 |
| 5,887,037 A | * | 3/1999 | Golden et al. .............. | 375/347 |
| 5,920,599 A | | 7/1999 | Igarashi | |
| 5,999,826 A | * | 12/1999 | Whinnett .................... | 455/561 |
| 6,125,152 A | | 9/2000 | Golden et al. | |
| 6,147,985 A | | 11/2000 | Bar-David et al. | |
| 6,191,736 B1 | * | 2/2001 | Yukitomo et al. .......... | 342/383 |
| 6,430,173 B1 | * | 8/2002 | Posti et al. ................. | 370/347 |
| 6,442,218 B1 | * | 8/2002 | Nakamura et al. .......... | 375/340 |
| 6,456,669 B1 | * | 9/2002 | Sakoda ........................ | 375/283 |
| 6,470,006 B1 | * | 10/2002 | Moulsley .................... | 370/347 |
| 6,483,884 B1 | * | 11/2002 | Shen et al. ................. | 375/347 |
| 6,490,271 B1 | * | 12/2002 | Erjanne ...................... | 370/347 |
| 6,545,996 B1 | * | 4/2003 | Falco et al. ................ | 370/347 |

(Continued)

FOREIGN PATENT DOCUMENTS

EP  836 291  4/1998

(Continued)

Primary Examiner—Edan Orgad
Assistant Examiner—Andrew C. Lee
(74) Attorney, Agent, or Firm—Pillsbury Winthrop Shaw Pittman LLP; Larry J. Hume

(57) ABSTRACT

A method for improving the quality of data transmission in cellular radio systems utilizes time division multiple access, in which the strength of a signal received at a base station is measured and a decoder for soft decision-making is employed. The method includes measuring the strength of the signal the base station receives in at least two consecutive time slots and determining a weighting coefficient by comparing the signal strengths and reducing, using the determined weighting coefficient in a soft bit decision-making, the significance of at least one symbol at the beginning of the burst the base station receives in a time slot if the difference between the measured signal strengths is considerable.

22 Claims, 4 Drawing Sheets

U.S. PATENT DOCUMENTS

| | | | |
|---|---|---|---|
| 6,563,884 B1 * | 5/2003 | Nikula | 375/295 |
| 6,577,686 B1 * | 6/2003 | Koga et al. | 375/347 |
| 6,658,235 B1 * | 12/2003 | Tolmunen et al. | 455/67.13 |
| 6,700,919 B1 * | 3/2004 | Papasakellariou | 375/130 |
| 6,711,124 B2 * | 3/2004 | Khayrallah et al. | 370/208 |
| 6,721,367 B1 * | 4/2004 | Miya et al. | 375/267 |
| 6,729,929 B1 * | 5/2004 | Sayers et al. | 455/446 |
| 6,795,425 B1 * | 9/2004 | Raith | 370/345 |
| 6,795,428 B1 * | 9/2004 | Diachina et al. | 370/349 |
| 6,829,226 B1 * | 12/2004 | Apostolides et al. | 370/318 |
| 6,912,228 B1 * | 6/2005 | Dahlman et al. | 370/441 |

FOREIGN PATENT DOCUMENTS

| | | |
|---|---|---|
| EP | 866 578 | 9/1998 |
| FI | 106681 | 3/2001 |
| WO | WO 00/16528 | 3/2000 |
| WO | WO 00/72540 | 11/2000 |
| WO | WO 01/15332 | 3/2001 |

* cited by examiner

METHOD FOR IMPROVING THE QUALITY OF DATA TRANSMISSION

This is a Continuation of International Application No. PCT/FI01/00606, which was filed on Jun. 25, 2001, which designated the U.S., and was filed in the English language.

FIELD OF THE INVENTION

The invention relates to a method for improving the quality of data transmission in cellular radio systems utilizing time division multiple access in near-far situations.

BACKGROUND OF THE INVENTION

Time Division Multiple Access or TDMA represents one way of dividing restricted radio frequency resources between several users. In time division multiple access systems, each frequency band is divided into time slots. Each user obtains a transmission or reception turn in a specific time slot. Time division multiple access requires a pulse-like transmission, meaning that each sender sends signal in a specific time slot and ends the transmission when the time has ran out. Consequently a need arises to ramp up and to ramp down the power of the transmitter as rapidly as possible in order to use the specific transmission turn efficiently and to disturb the other users of the same frequency as little as possible. In practice, the transmission pulses spread out from the ideal rectangle shape and slide slightly over one another, thus interfering with one another at the beginning and end of the pulse. In practice a rectangle pulse is not used, as it causes interference to the frequency spectrum, wherefore safety times have been defined in the GSM system (Global System for Mobile Communication) to ramp up and ramp down the power. If the latest received pulse in the detection is weak and the previously received pulse is strong, it is obvious that the spread of the pulses causes interference to the first symbols of the weaker pulse.

The filters in the receiver as well as the radio channel spread impulse response, thus causing interference. How much impulse response the filters spread, depends on the number of taps in the filter that deviate from zero: the larger the number of taps the wider the impulse response becomes. Then again, the idea is to obtain as much as possible of the energy in the received signal to the impulse response. The longer the impulse response of the filter in the receiver is, the more of the energy in the received signal is obtained into the impulse response estimate.

Generally time division multiple access is associated for example with frequency division multiple access. An example of such a system is the GSM, in which a 200 kHz frequency band is divided into eight time slots, each one being 577 μs long. A part of the time slot is allocated to ramp up and ramp down the power, each user in the system therefore has 542,8 μs or 147 bits of effective message transmission time.

Currently a need is created to increase the data transmission rate also in wireless data transmission in order to be able to transfer data in addition to speech and to offer, for example, wireless Internet services to the end users of the telecommunications systems. Such a development has increased the requirements for the interference tolerance of the systems, since a higher data transmission rate requires a more efficient modulation method, and a more efficient modulation method results in a system that is more liable to interference.

In cellular radio networks large radio cells, or macro cells, can be formed. Then the operators may cover geographically large areas with a few base stations. The solution is advantageous in sparsely inhabited areas, where traffic is scarce and therefore only a few radio channels are needed in each cell. However, the near-far problem has to be resolved in macro cells. Such a problem is created in a situation in which the base station receives transmission from both a subscriber terminal located near the base station and from a subscriber terminal located far from the base station. A signal arriving from far attenuates along the way and a signal arriving from nearby may efficiently interfere with it. The worst situation occurs if both transmitters employ the same frequency and are placed in adjacent time slots.

BRIEF DESCRIPTION OF THE INVENTION

It is an object of the invention to provide a method for improving the quality of data transmission in cellular radio systems utilizing time division multiple access, particularly in near-far situations, and an apparatus for implementing the method. This is achieved with the method for improving the quality of data transmission in cellular radio systems utilizing time division multiple access, in which the strength of a signal received at a base station is measured and a decoder for soft decision-making is employed. The method comprises the steps of measuring the strength of the signal the base station receives in at least two consecutive time slots, determining a first weighting coefficient by comparing the strength of the signal the base station receives in a time slot with the strength of the signal the base station receives in a previous time slot, determining a second weighting coefficient by comparing the strength of the signal the base station receives in a time slot with the strength of the signal the base station receives in a following time slot, reducing by means of the first determined weighting coefficient in soft bit decision-making the significance of at least one symbol at the beginning of the burst the base station receives in a time slot if the difference between the measured signal strengths is considerable, reducing by means of the second determined weighting coefficient in soft bit decision-making the significance of at least one symbol at the end of the burst the base station receives in a time slot if the difference between the measured signal strengths is considerable.

The invention also relates to a method for improving the quality of data transmission in cellular radio systems utilizing time division multiple access, in which the strength of a signal received at a base station is measured and a decoder for soft decision-making is employed. The method of the invention comprises the steps of measuring the strength of the signal the base station receives in at least two consecutive time slots, determining a first weighting coefficient by comparing the strength of the signal the base station receives in a time slot with the strength of the signal the base station receives in a previous time slot, reducing by means of the first determined weighting coefficient in soft bit decision-making the significance of at least one symbol at the beginning of the burst the base station receives in a time slot if the difference between the measured signal strengths is considerable.

The invention further relates to a method for improving the quality of data transmission in cellular radio systems utilizing time division multiple access, in which the strength of a signal received at a base station is measured and a decoder for soft decision-making is employed. The method of the invention comprises the steps of measuring the strength of the signal the base station receives in at least two consecutive time slots, determining a second weighting coefficient by comparing the strength of the signal the base station receives in a time slot with the strength of the signal the base station receives in a following time slot, reducing by means of the second determined weighting coefficient in soft bit decision-making the significance of at least one symbol at the end of the burst the base station receives in a time slot if the difference between the measured signal strengths is considerable.

The invention also relates to a base station receiver improving the quality of data transmission in cellular radio systems utilizing time division multiple access, which receiver measures the strength of a received signal and employs a decoder for soft decision-making. The base station of the invention comprises means for measuring the strength of the signal the base station receives in at least two consecutive time slots, means for determining a first weighting coefficient by comparing the strength of the signal the base station receives in a time slot with the strength of the signal the base station receives in a previous time slot, means for determining a second weighting coefficient by comparing the strength of the signal the base station receives in a time slot with the strength of the signal the base station receives in a following time slot, means for reducing by means of the first determined weighting coefficient in soft bit decision-making the significance of at least one symbol at the beginning of the burst the base station receives in a time slot if the difference between the measured signal strengths is considerable, means for reducing by means of the second determined weighting coefficient in soft bit decision-making the significance of at least one symbol at the end of the burst the base station receives in a time slot if the difference between the measured signal strengths is considerable.

The invention further relates to a base station receiver improving the quality of data transmission in cellular radio systems utilizing time division multiple access, which receiver measures the strength of a received signal and employs a decoder for soft decision-making. The base station of the invention comprises means for measuring the strength of the signal the base station receives in at least two consecutive time slots, means for determining a first weighting coefficient by comparing the strength of the signal the base station receives in a time slot with the strength of the signal the base station receives in a previous time slot, means for reducing by means of the first determined weighting coefficient in soft bit decision-making the significance of at least one symbol at the beginning of the burst the base station receives in a time slot if the difference between the measured signal strengths is considerable.

The invention further relates to a base station receiver improving the quality of data transmission in cellular radio systems utilizing time division multiple access, which receiver measures the strength of a received signal and employs a decoder for soft decision-making. The base station of the invention comprises means for measuring the strength of the signal the base station receives in at least two consecutive time slots, means for determining a second weighting coefficient by comparing the strength of the signal the base station receives in a time slot with the strength of the signal the base station receives in a following time slot, means for reducing by means of the second determined weighting coefficient in soft bit decision-making the significance of at least one symbol at the end of a burst the base station receives in a time slot if the difference between the measured signal strengths is considerable.

The invention is based on the idea that the strength of a signal received in each time slot of the same frequency band is determined in the base station and that the signal of each time slot is compared with a signal of a previous time slot. Consequently it can be established whether the strength difference between the signals of consecutive time slots is significant, and the weighting coefficient can be determined. If the strength difference is considerable, the weighting coefficient ranges between 0 and 1, then the first symbols and/or last symbols of the weak pulse are weighted in the soft decision-making decoder. The greater the strength difference between the signals received in adjacent time slots, the smaller the weighting coefficient. The reliability of the detection can thus be improved, whereas the significance of unreliable symbols in a weak pulse decreases. Actual bit decisions in soft decision-making are not altered in the method. The method improves the reliability of the detection without interfering with the operation of a channel equalizer, and therefore without misinterpreting the information obtained concerning the state of the radio channel.

The preferred embodiments are disclosed in the dependent claims.

BRIEF DESCRIPTION OF THE DRAWINGS

In the following the invention will be described in greater detail by means of the preferred embodiments with reference to the accompanying drawings, in which.

DETAILED DESCRIPTION OF THE INVENTION

Figure 1:
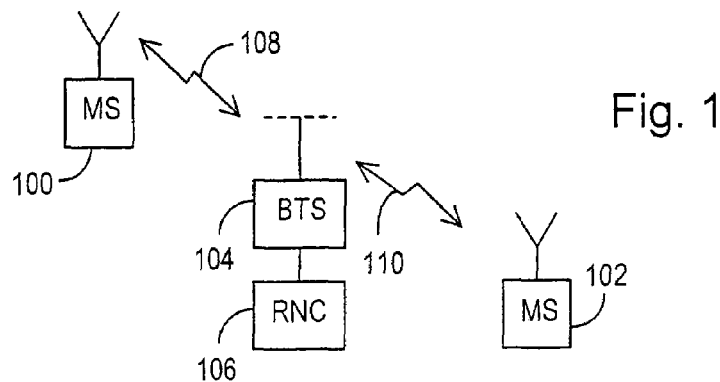
FIG. 1 illustrates an example of a data transmission system.

FIG. 1 illustrates in a simplified manner a digital data transmission system, in which the solution of the invention can be applied. What is concerned is a part of a cellular radio system that comprises a base station 104 having a radio connection 108 and 110 with subscriber terminals 100 and 102, which may be fixedly located, vehicle mounted or portable hand-held terminals. The base station 104 also communicates with a base station controller 106, which transmits the terminal connections 100, 102 to other parts of the network or to a public switched telephone network. The base station controller 106 controls several base stations 104 communicating therewith in a centralized manner. A control unit located in the base station controller 106 carries out call control, mobility management, collection of statistical data and signalling.

Figure 2:
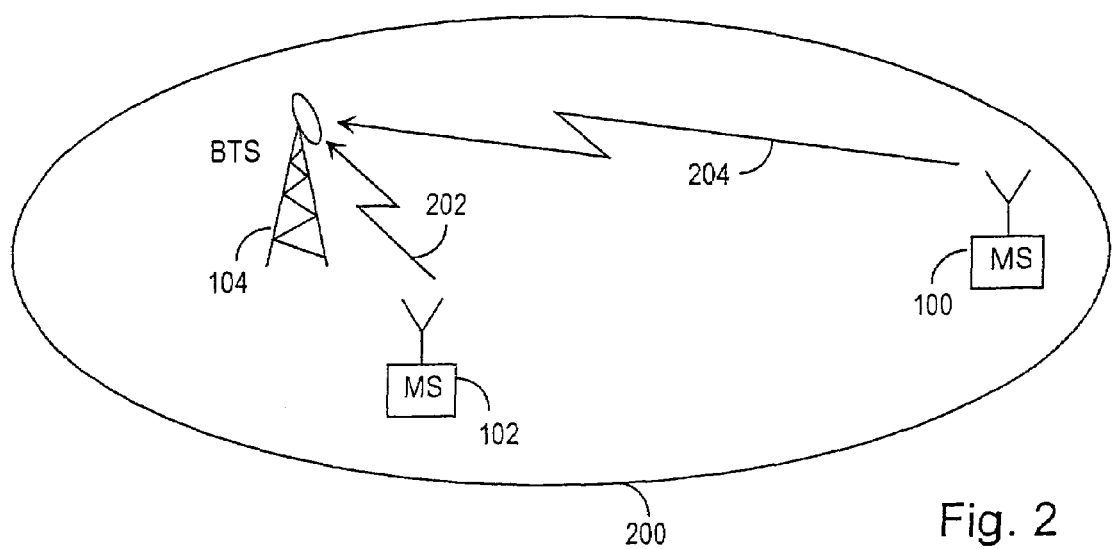
FIG. 2 illustrates an example of a near-far problem.

FIG. 2 illustrates in a simplified manner a near-far problem that mainly occurs in macro cells in cellular radio systems. In FIG. 2 the base station 104 receives transmission 202, 204 from two subscriber terminals, one of which 100 being placed on the border of a macro cell 200 and thus far from the base station and the other one 102 being placed near the base station 104.

The signal 204 arriving from a longer distance attenuates more on the radio path than the signal arriving from close by, for example by being absorbed and scattered owing to obstacles such as formations in the terrain, buildings and medium, like rain. Even if the system uses transmission power control, like the GSM system, the power control dynamics may be inadequate, as the signal strength difference in a receiver of the base station may reach 50 dB or 60 dB. The multi-path propagation attenuating the signal also increases as the distance between the transmitter and receiver antennas increases. A problem that arises in signal attenuation is that the signal-to-noise ratio deteriorates. When the signal-to-noise ratio deteriorates the bit error ratio, or the number of erroneous bits among all bits, increases. When the signal has attenuated excessively, for example, because a transmitter is too far from the receiver or if too much interference occurs on the radio path, then signal detection becomes impossible.

Figure 3:
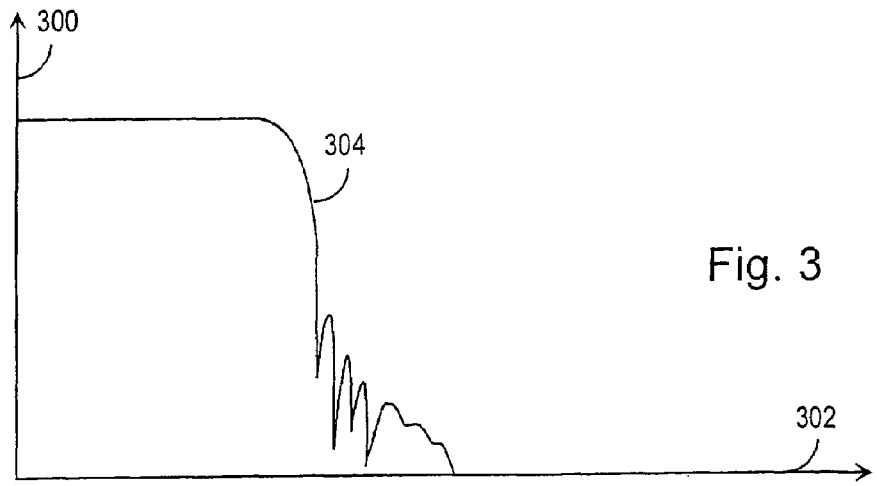
FIG. 3 illustrates an example of a TDMA burst.

FIG. 3 is an example illustrating an end 304 of a TDMA burst. A vertical axis 300 shows signal strength and a horizontal axis 302 shows time. The vertical axis is logarithmic. The Figure shows that the signal does not attenuate immediately at the end of the burst, but the signal remains "ringing" for a while, meaning that attenuation requires a certain time that depends on for example the selected modulation method, the form of the carrier wave and the signal power. During this time, a second signal employing the same frequency is sent in the TDMA system, which signal the system has provide with the following time slot. The signals of different time slots are therefore spread partly over each other, thus interfering with one another. A pulse-like signal spreads as described also at the front edge of the pulse.

Figure 4:
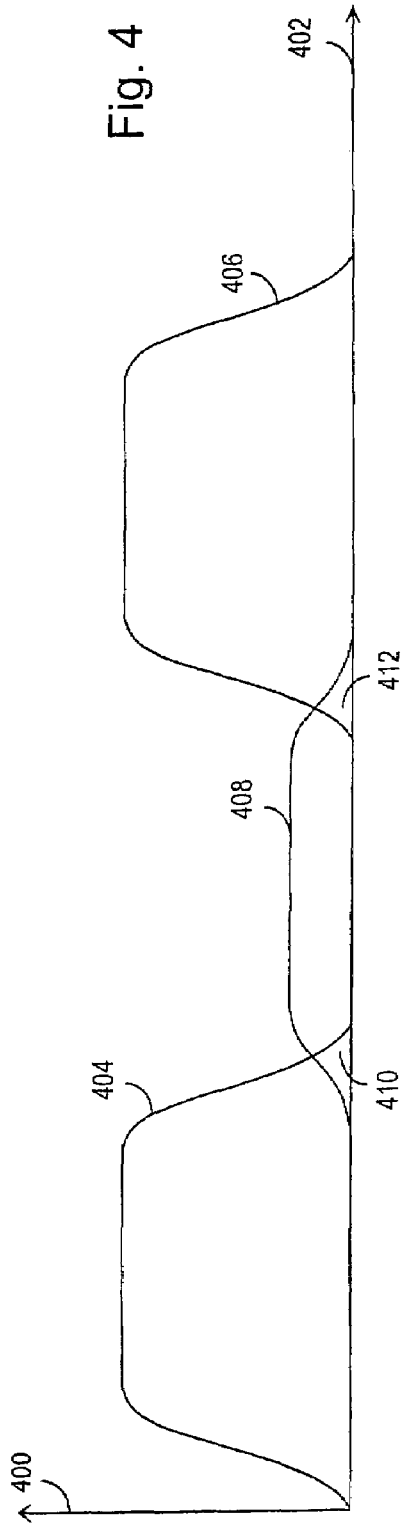
FIG. 4 illustrates an example of a TDMA bursty near-far situation.

FIG. 4 illustrates how signals sent in different time slots spread at the beginning and at the end of the pulse over each other. A vertical axis 400 shows signal strength and a horizontal axis 402 time. Each pulsed signal 404, 406 and 408 is placed in a time slot of the same length. The signals 404, 406 are sent from a point near the base station and they are approximately 50 dB stronger than a signal 408, which is sent from a point far from the base station. The situation shown in FIG. 4 occurs when the size of the cell is adequate, i.e. in macro cell applications or in such network solutions in which cells having a wider area are connected with cells having a smaller area, for instance in the umbrella solutions where the basic coverage is implemented by means of a large cell at such places which are heavily trafficked, or have extensive capacity requirements, and where one or more small cells are also provided and placed beneath the large cell or "umbrella".

FIG. 4 shows that the interference the more powerful signal causes to the less powerful signal can be considerable in comparison with the strength of the less powerful signal at the beginning 410 and end 412 of the pulse. Thus an erroneous bit decision can be made in the detector for some first and last bits. Depending on the detector and the error detection and correction methods (such as coding and interleaving) as well as the number of erroneous bit decisions, the detector either recovers from an erroneous decision or the detection of the symbol string fails.

Figure 6A:
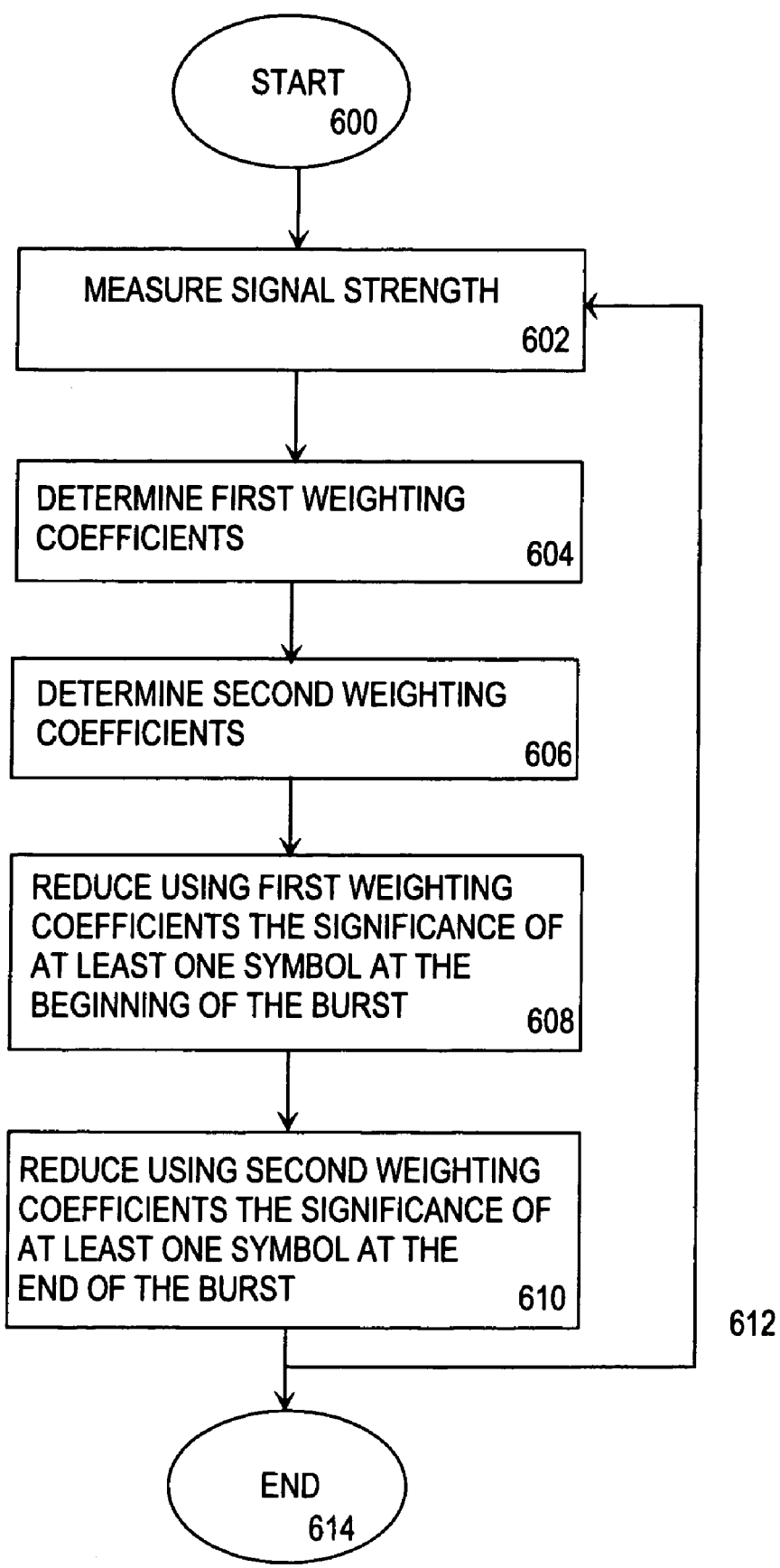
FIGS. 6a to c are flow charts showing the method steps for improving the reliability of signal detection in a near-far situation in a TDMA system.
Figure 6B:
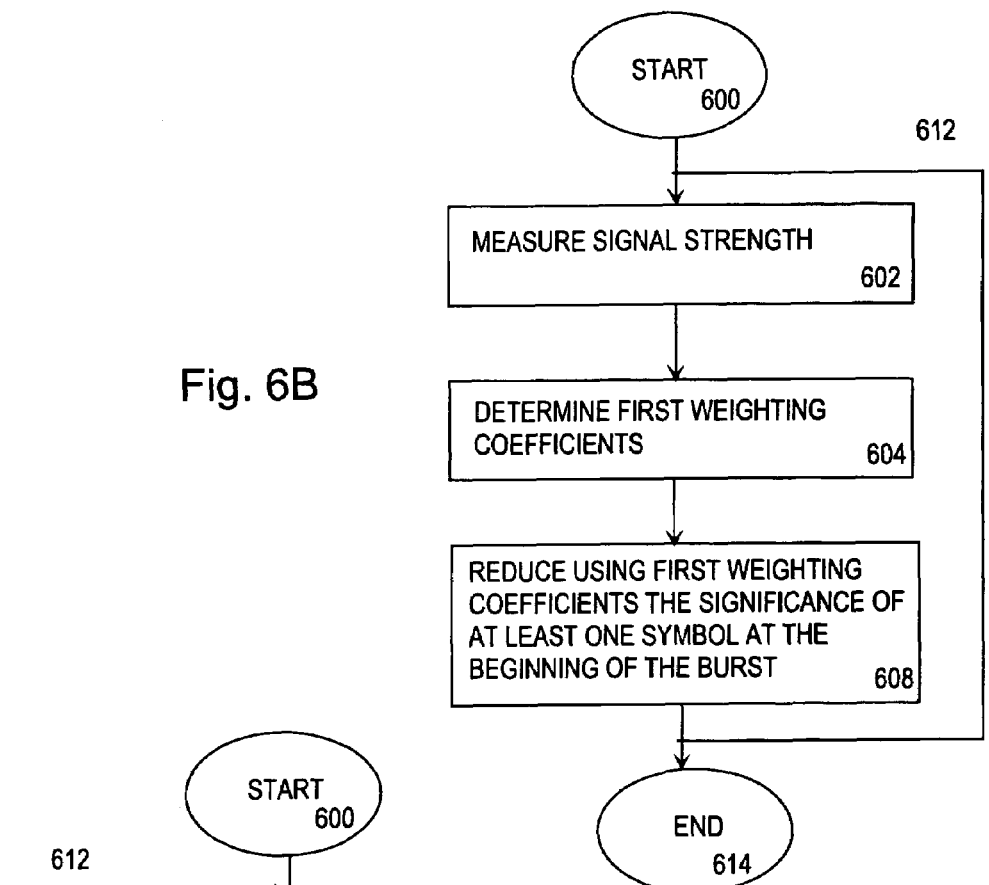
Figure 6C:
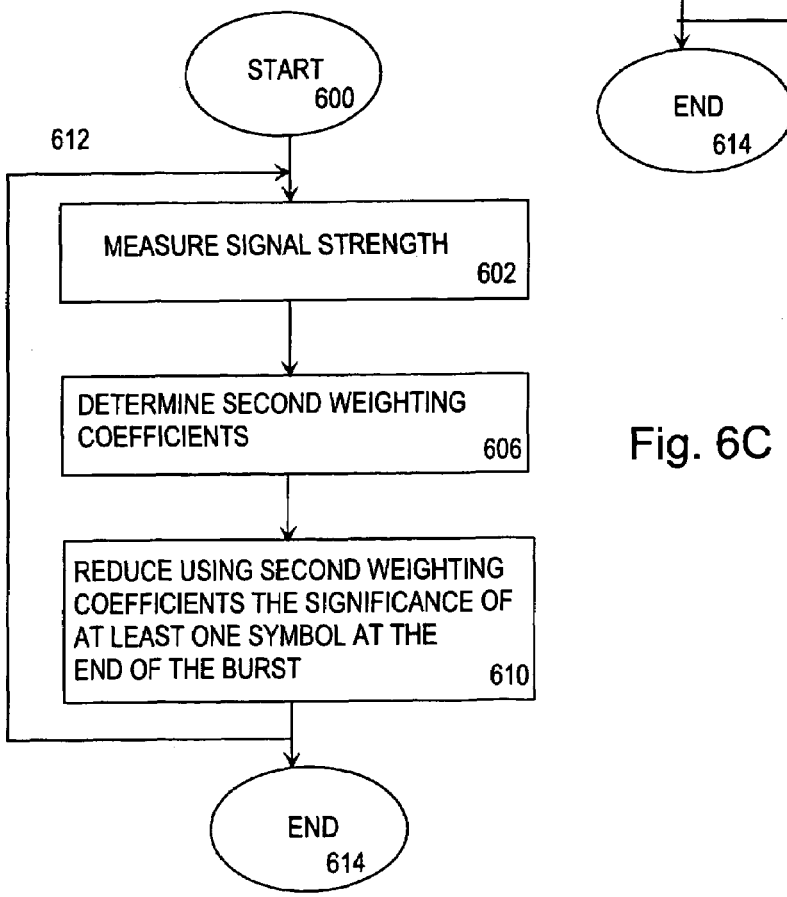

FIGS. 6a to c show the method steps for improving the reliability of the signal detection in the above TDMA system in a near-far situation. The method starts from block 600. In block 602 the strength of a received signal is measured in at least two consecutive time slots. The method utilizes measurements that determine the strength of the signal received at the base station, for example the RSSI definition (Received Signal Strength) of the GSM system.

Next in block 604 the weighting coefficients are determined for each signal in the soft decision-making of the channel decoding by comparing the strength of the signal received at the base station with the strength measurement value of the signal received in a previous time slot preferably stored in the base station memory. The weighting coefficient $K_{w1}$ ranges between $0<K_{w1}<1$. The weighting coefficient $K_{w1}$ can be determined as follows $$K_{w1}=g_n(SR_p-SR_c), \text{ where}$$

$g_n$ represents a freely selectable scalar, function or functionality by which the weighting coefficient is scaled between $0<K_{w1}<1$, where n represents an integer number, $SR_p$ represents the strength of the signal received at the base station in a previous time slot, $SR_c$ represents the strength of the signal received at the base station in a time slot to be detected.

The method allows to calculate the weighting coefficients, which can still be scaled to suit the system. The scaling coefficients $g_n$ can either have the same values for all the bits in the same time slot, in which case $g_1=g_2=\ldots=g_n$ or they may bit-specifically all have different values, or some of them may have the same values and some of them may have different values. Furthermore, if necessary, the scaling coefficient $g_n$ may also be dependent on the difference $SR_f-SR_c$ between the signal strengths.

Next in block 606 the weighting coefficients are determined for each signal in the soft bit decision-making of the channel decoding in the base station by comparing the strength of the signal received at the base station preferably with the strength measurement value of the signal received in the following time slot stored in the base station memory. The weighting coefficient $K_{w2}$ ranges between $0<K_{w2}<1$. The second weighting coefficient $K_{w2}$ can be determined in the same way as the weighting coefficient $K_{w1}$ as follows $$K_{w2}=g_n(SR_f-SR_c),$$

where $g_n$ represents a freely selectable scalar, function or functionality by which the weighting coefficient is scaled to range between $0<K_{w2}<1$, where n represents an integer number, $SR_f$ represents the strength of the signal received at the base station in a subsequently received time slot, $SR_c$ represents the strength of the signal received at the base station in a time slot to be detected.

The method allows to calculate the weighting coefficients, which can still be scaled to suit the system. The scaling coefficients $g_n$ can either have the same values for all the bits in the same time slot, in which case $g_1=g_2=\ldots=g_n$ or they may bit-specifically all have different values, or some of them may have the same values and some of them may have different values. Furthermore, if necessary, the scaling coefficient $g_n$ may also be dependent on the difference $SR_f-SR_c$ between the signal strengths.

In a following block 608 a predetermined number of symbols, referring to a character string comprising one or more bits, is weighted by means of the first weighting coefficient $K_{w1}$ determined at the beginning of the burst, i.e. the pulse in the soft decision-making of the channel decoding, if the strength difference between the signal in the soft decision-making of the channel decoding and the signal received in the previous time slot is considerable enough.

In block 608 the bits at the beginning of the pulse in the soft decision-making are weighted for example as follows $$\begin{bmatrix} S'_{val1} \\ S'_{val2} \\ \ldots \\ S'_{valn} \end{bmatrix} = \begin{bmatrix} g_1(SR_p - SR_c) & 0 & 0 & 0 \\ 0 & g_2(SR_p - SR_c) & 0 & 0 \\ \ldots & \ldots & \ldots & \ldots \\ 0 & 0 & g_n(SR_p - SR_c) & 0 \end{bmatrix} \begin{bmatrix} S_{val1} \\ S_{val2} \\ \ldots \\ S_{valn} \end{bmatrix}$$

where
- $S'_{val1} \ldots S'_{valn}$ represents a soft bit decision that succeeds the weighting,
- $S_{val1} \ldots S_{valn}$ represents an original soft bit decision,
- $g_n$ represents a freely selectable scalar, function or functionality by which the weighting coefficient is scaled between 0-1, where n represents an integer number,
- $SR_p$ represents the strength of the signal received at the base station in a previous time slot,
- $SR_c$ represents the strength of the signal received at the base station in a time slot to be detected.

Correspondingly in block 610 a predetermined number of symbols, referring to a character string comprising one or more bits, is weighted by means of the second weighting coefficient $K_{w2}$ determined at the beginning of the burst, i.e. the pulse in the soft decision-making of the channel decoding, if the strength difference between the signal in the soft decision-making of the channel decoding and the signal received in the previous time slot is considerable enough.

In block 610 the bits at the end of the pulse in the soft decision-making are weighted for example as follows $$\begin{bmatrix} S'_{val1} \\ S'_{val2} \\ \ldots \\ S'_{valn} \end{bmatrix} = \begin{bmatrix} g_1(SR_f - SR_c) & 0 & 0 & 0 \\ 0 & g_2(SR_f - SR_c) & 0 & 0 \\ \ldots & \ldots & \ldots & \ldots \\ 0 & 0 & g_n(SR_f - SR_c) & 0 \end{bmatrix} \begin{bmatrix} S_{val1} \\ S_{val2} \\ \ldots \\ S_{valn} \end{bmatrix}$$

where
- $S'_{val1} \ldots S'_{valn}$ represents a soft bit decision that succeeds the weighting,
- $S_{val1} \ldots S_{valn}$ represents an original soft bit decision,
- $g_n$ represents a freely selectable scalar, function or functionality by which weighting coefficient is scaled between 0-1, where n represents an integer number,
- $SR_f$ represents the strength of the signal received at the base station in a following time slot,
- $SR_c$ represents the strength of the signal received at the base station in a time slot to be detected.

It should be noted that the scaling coefficients $g_1 \ldots g_n$ can either have the same values for all bits in the same time slot, in which case $g_1 = g_2 = \ldots = g_n$ or they may bit-specifically all have different values, or some of them may have the same values and some of them may have different values. Furthermore, if necessary, the scaling coefficient $g_n$ may also be dependent on the difference between the signal strengths.

The strength difference between the received signals is often significant in a near-far situation illustrated in FIG. 2. It is preferable to set a threshold value for the use of the weighting coefficients that may for example equal a 40 dB strength difference for the received signals. The choice of a threshold value depends on the system in use, for example on the cell size. The symbols are weighted after channel correction, wherefore the bit error ratios determined from the radio channel are not changed and therefore the quality data of the channel is not distorted. The advantage of the method is that the probability of the authenticity in a soft bit decision is taken into account in channel decoding, and thus the effect of unreliable decisions to the detection of the entire information bit string to be coded is reduced.

Simulations have shown that as regards small signal-to-noise ratio values different weighting coefficients do not provide significant differences for the bit error ratios, and therefore the weighting coefficients can be selected to suit each situation fairly freely between $0 < K_{w1} < 1$ and $0 < K_{w2} < 1$, if the aim is to improve the capacity of the system with small signal-to-noise ratios in particular.

It should be noted that according to a preferred embodiment of the invention the method may be used to determine both weighting coefficients $K_{w1}$ and $K_{w2}$, or only one of them. FIG. 6a shows how both weighting coefficients $K_{w1}$ and $K_{w2}$ are determined, and how the weighting coefficient $K_{w1}$ is used to reduce the significance of the bits at the beginning of the burst in the soft decision-making of the channel decoding and how the weighting coefficient $K_{w2}$ is used to reduce the significance of the bits at the end of the burst in the soft decision-making of the channel decoding. FIG. 6b shows how the weighting coefficient $K_{w1}$ is determined, and how the significance of the bits at the beginning of the burst in the soft decision-making of the channel decoding detected by means of the weighting coefficient $K_{w1}$ is reduced. FIG. 6c shows how the weighting coefficient $K_{w2}$ is determined and how the significance of the bits at the end of the burst in the soft decision-making of the channel decoding detected by means of the weighting coefficient $K_{w2}$ is reduced.

Arrow 612 illustrates the repeatability of the method in each time slot. The method ends in block 614.

Figure 5:
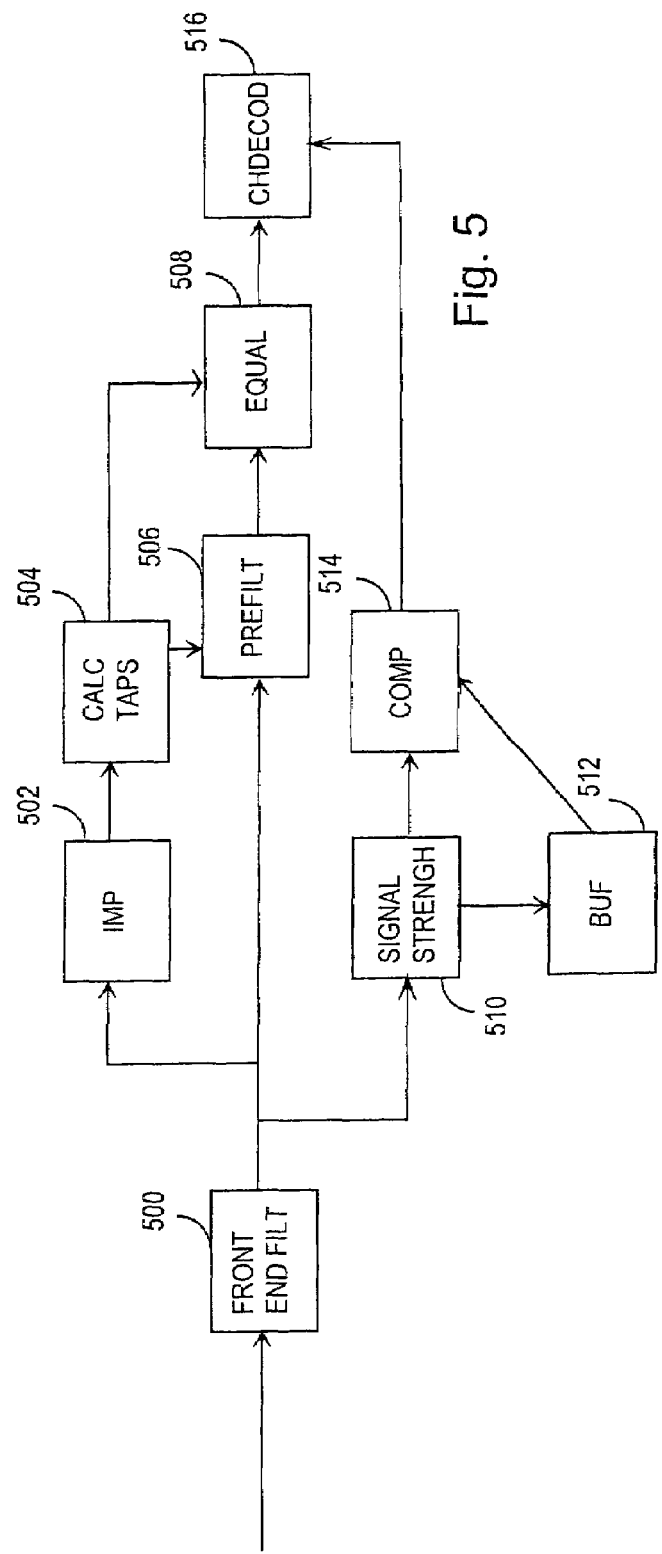
FIG. 5 shows a solution of a receiver structure that allows to reduce the errors caused by the near-far problem in detection.

FIG. 5 shows a receiver solution that can be used to reduce the errors caused by the near-far problem in the detection. The receiver shown in FIG. 5 merely illustrates the essential structural parts of the preferred embodiment of the invention required in signal detection, and focuses on describing the channel equalizer and the receiver structures associated therewith. For example RF or radio frequency parts and baseband parts are not described herein. The signal received in block 500 is filtered in order to restore the signal distorted on the channel into the original data flow using symbol error probability that depends on the interference factors, such as the inter-system interference ISI. Typically a matched filter is employed. As to the application of the invention, the choice of filter or planning method is not essential, and they will therefore not be described in greater detail in this context. Different filter planning methods are commonly known in the art.

Next the signal is filtered in a pre-filter 506. The input signals of the pre-filter 506 are the output signals of block 500 and block 504.

An impulse response is estimated in block 502, and the input signal thereof is a received, sampled and filtered signal. The impulse response is estimated in accordance with the prior art by cross-correlating the received samples with a known sequence. An impulse response estimation method, which is applied to known systems and employed for example in the GSM system, utilizes a known training sequence connected with the burst. In such a case, 16 bits of the 26-bit training sequence are used to estimate each impulse response tap. The functions described above can be implemented in various ways, for example, using software implemented by a processor or using an apparatus implementation, such as a logic built up of discrete components or using ASIC (Application Specific Integrated Circuit).

The tap coefficients of the pre-filter 506 and a channel equalizer 508 are calculated in block 504. An output signal of block 502 functions as input signals of the block. The estimated impulse response values can be used to determine the tap coefficients of the pre-filter. The pre-filters may either be of FIR (Finite Impulse Response) or IIR (Infinite Impulse Response) type, but not matched filters. The IIR filters require less parameters, less memory and calculation capacity than the FIR filters, which have an equally smooth stop band, but the IIR filters cause phase distortion. As to the application of the invention, the choice of filter or planning method is not essential, and therefore they are not explained in greater detail in this context. Various filter planning methods are commonly known in the art.

Block 508 presents a channel equalizer, which aims to correct the distortion that has appeared to the signal on the radio channel. The input signals of block 508 are the output signals of blocks 504 and 506. Various types of channel equalizers are generally known in the art. In practice the most common ones are a linear equalizer, a non-linear decision feedback equalizer DFE and a Viterbi algorithm based on a Maximum Likelihood receiver. As regards the Viterbi algorithm the optimization criterion of the equalizer is the error probability of the sequence. The equalizer can be implemented for example using a linear FIR type filter. Such an equalizer can be optimized using various optimization criteria. The error probability is non-linearly dependent on the coefficients of the equalizer, and thus the most common practical optimization criterion is a Mean-Square Error MSE, or error power $$J_{min}=E|I_k-\hat{I}_k|^2,$$

where
$J_{min}$ represents the mean-square error name,
$I_k$ represents a reference signal,
$\hat{I}_k$ represents a reference signal estimate, and
E represents the expected value.

As regards the application of the invention the choice of equalizer or optimization method are not essential, and they will therefore not be explained In greater detail in this context. Various optimization methods of different equalizers are commonly known in the art.

The functions described above can be implemented in many ways, for example, using software implemented by a processor or using an apparatus implementation, such as a logic build up of discrete components or using ASIC.

The strength of the received signal is determined in block 510. The signal strength can be defined utilizing the available measurements carried out by the cellular radio system; the GSM system may, for example, utilize the RSSI (Received Signal Strength Indicator) measurement. In block 514 the last determined signal strength value is compared with the signal strength value received in the previous time slot stored in the memory 512. The weighting coefficient $K_w$ obtained from the comparison and scaled with the possibly appropriate scaling coefficient g is used to weight the symbols to be decoded in a decoder 516. It should be noted that two weighting coefficients are determined for each signal to be channel decoded: one for the symbols ($K_{w1}$) at the beginning of the pulse and the other for the symbols ($K_{w2}$) at the end of the pulse as shown in flow chart 6.

The input signals of the decoder 516 are the output signals of blocks 508 and 514.

In channel coding systematic redundancy is added to the signal that is used for error detection and correction in the channel decoder. Redundancy is added in parity bits. The parity bits are calculated from information bits using specific channel coding algorithms. The channel coding algorithms are known in the art and are therefore not explained in greater detail herein. When the signal is decoded error correction is carried out in two stages. First an erroneous symbol block is detected and the position of the error in the symbol block is indicated, then the error is corrected by inverting or reversing the erroneous bit, for example an erroneous 0-bit is reversed to 1-bit. Error detection is based on the fact that the decoder calculates the parity bits again and compares the recalculated parity bits with the received parity bits.

There are two types of decoding: hard decision decoding and soft decision decoding. Hard decision-making comprises two quantizing levels whereas soft decision-making comprises several quantizing levels. In quantization information is lost owing to sampling, but generally eight quantizing levels are sufficient, whereby the sample is coded using three bits. Soft decision-making thus approximates the non-quantized decoding.

In the input of the decoder 516 the portion of the error ratio, or erroneous bits, of all bits must be small enough in order for the decoder to operate. If the decoder does not receive an adequate number of correct bits, it starts to increase errors. Error tolerance can be improved using long and complex codes. However, it should be noted that the more complex the channel code is the more time it requires for decoding and the more bandwidth the information transfer on the radio channel requires while the information rate remains the same.

In the solutions according to the preferred embodiment of the invention, if the strength difference between the received pulses is considerable, the weighting coefficients $K_{w1}$ and $K_{w2}$ are determined to be small, and the weighting coefficient $K_{w1}$ is used to weight the first symbols of a weak pulse and the weighting coefficient $K_{w2}$ is used to weight the last symbols of a weak pulse. If only one pulse, either the pulse preceding or succeeding the pulse in the soft decision-making of the channel decoding, is strong then only one of the coefficients $K_{w1}$ or $K_{w2}$ can be used. Consequently the significance of unreliable bits can be reduced in the detection of an information block. It should be noted that the actual bit decisions are not altered.

The operations described above can be implemented in various ways, for example, using software implemented by a processor or using an apparatus implementation, such as a logic built up of discrete components or using ASIC.

Even though the invention has been described above with reference to the example of the accompanying drawings, it is obvious that the invention is not restricted thereto but can be modified in various ways within the scope of the inventive idea disclosed in the attached claims.

The invention claimed is:

1. A method for improving the quality of data transmission in cellular radio systems utilizing time division multiple access, the method comprising:
    measuring the strength of the signal the base station receives in at least two consecutive time slots, wherein the difference in signal strengths is considerable enough to produce an erroneous bit decision if the difference exceeds a determined threshold value,
    determining a first weighting coefficient by comparing the strength of the signal the base station receives in a time slot with the strength of the signal the base station receives in a previous time slot,
    determining a second weighting coefficient by comparing the strength of the signal the base station receives in a time slot with the strength of the signal the base station receives in a following time slot, reducing, using the first determined weighting coefficient, in soft bit decision-making in a decoder, the significance of at least one symbol at a beginning of a burst the base station receives in a time slot if the difference between the measured signal strengths is considerable enough to produce an erroneous bit decision, and reducing, using the second determined weighting coefficient, in soft bit decision-making in the decoder, the significance of at least one symbol at an end of the burst the base station receives in a time slot if the difference between the measured signal strengths is considerable enough to produce an erroneous bit decision.

2. A method for improving the quality of data transmission in cellular radio systems utilizing time division multiple access, the method comprising:

measuring the strength of the signal the base station receives in at least two consecutive time slots, wherein the difference in signal strengths is considerable enough to produce an erroneous bit decision if the difference exceeds a determined threshold value, determining a weighting coefficient by comparing the strength of the signal the base station receives in a time slot with the strength of the signal the base station receives in a previous time slot, and reducing, using the determined weighting coefficient, in soft bit decision-making in a decoder, the significance of at least one symbol at the beginning of a burst the base station receives in a time slot if the difference between the measured signal strengths is considerable enough to produce an erroneous bit decision.

3. A method for improving the quality of data transmission in cellular radio systems utilizing time division multiple access, the method comprising:

measuring the strength of the signal the base station receives in at least two consecutive time slots, wherein the difference in signal strengths is considerable enough to produce an erroneous bit decision if the difference exceeds a determined threshold value, determining a weighting coefficient by comparing the strength of the signal the base station receives in a time slot with the strength of the signal the base station receives in a following time slot, and reducing, using the determined weighting coefficient, in soft bit decision-making in a decoder, the significance of at least one symbol at an end of a burst the base station receives in a time slot if the difference between the measured signal strengths is considerable enough to produce an erroneous bit decision.

4. A method as claimed in claim 1, 2 or 3, wherein the weighting coefficients are higher than 0 but lower than 1.

5. A method as claimed in claim 1, 2 or 3, wherein the strength of the signal received at the base station is determined using RSSI (Received Signal Strength Indicator) measurement.

6. A method as claimed in claim 1, 2 or 3, wherein the weighting coefficients have the same values for all symbols to be weighted in each time slot.

7. A method as claimed in claim 1, 2 or 3, wherein the weighting coefficients have different values for different symbols to be weighted in each time slot.

8. A base station receiver improving the quality of data transmission in cellular radio systems utilizing time division multiple access, the base station receiver comprising:

means for measuring the strength of the signal the base station receives in at least two consecutive time slots, wherein the difference in signal strengths is considerable enough to produce an erroneous bit decision if the difference exceeds a determined threshold value, means for determining a first weighting coefficient by comparing the strength of the signal the base station receives in a time slot with the strength of the signal the base station receives in a previous time slot, means for determining a second weighting coefficient by comparing the strength of the signal the base station receives in a time slot with the strength of the signal the base station receives in a following time slot, means for reducing, using the first determined weighting coefficient, in soft bit decision-making in a decoder, the significance of at least one symbol at a beginning of a burst the base station receives in a time slot if the difference between the measured signal strengths is considerable enough to produce an erroneous bit decision, and means for reducing, using the second determined weighting coefficient, in soft bit decision-making in the decoder, the significance of at least one symbol at an end of the burst the base station receives in a time slot if the difference between the measured signal strengths is considerable enough to produce an erroneous bit decision.

9. A base station receiver improving the quality of data transmission in cellular radio systems utilizing time division multiple access, the base station receiver comprising:

means for measuring the strength of the signal the base station receives in at least two consecutive time slots, wherein the difference in signal strengths is considerable enough to produce an erroneous bit decision if the difference exceeds a determined threshold value, means for determining a weighting coefficient by comparing the strength of the signal the base station receives in a time slot with the strength of the signal the base station receives in a previous time slot, and means for reducing, using the determined weighting coefficient, in soft bit decision-making making in a decoder, the significance of at least one symbol at a beginning of a burst the base station receives in a time slot if the difference between the measured signal strengths is considerable enough to produce an erroneous bit decision.

10. A base station receiver improving the quality of data transmission in cellular radio systems utilizing time division multiple access, the base station receiver comprising:

means for measuring the strength of the signal the base station receives in at least two consecutive time slots, wherein the difference in signal strengths is considerable enough to produce an erroneous bit decision if the difference exceeds a determined threshold value, means for determining a weighting coefficient by comparing the strength of the signal the base station receives in a time slot with the strength of the signal the base station receives in a following time slot, and means for reducing, using the determined weighting coefficient in soft bit decision-making in a decoder, the significance of at least one symbol at an end of a burst the base station receives in a time slot if the difference between the measured signal strengths is considerable enough to produce an erroneous bit decision.

11. A base station receiver as claimed in claim 8, 9 or 10, wherein the weighting coefficients are higher than 0 but lower than 1.

12. A base station receiver as claimed in claim 8, 9 or 10, wherein the strength of the signal received at the base station is determined using RSSI (Received Signal Strength Indicator) measurement.

13. A base station receiver as claimed in claim 8, 9 or 10, wherein the weighting coefficients have the same values for all symbols to be weighted in each time slot.

14. A base station receiver as claimed in claim 8, 9 or 10, wherein the weighting coefficients have different values for different symbols to be weighted in each time slot.

15. A base station receiver as claimed in claim 8, 9 or 10, wherein the base station receiver is implemented by a processor.

16. A base station receiver improving the quality of data transmission in cellular radio systems utilizing time division multiple access, the receiver comprising a processor configured to:

measure the strength of the signal the base station receives in at least two consecutive time slots, wherein the difference in signal strengths is considerable enough to produce an erroneous bit decision if the difference exceeds a determined threshold value, determine a first weighting coefficient by comparing the strength of the signal the base station receives in a time slot with the strength of the signal the base station receives in a previous time slot, determine a second weighting coefficient by comparing the strength of the signal the base station receives in a time slot with the strength of the signal the base station receives in a following time slot, reduce, using the first determined weighting coefficient, in soft bit decision-making in a decoder, the significance of at least one symbol at a beginning of a burst the base station receives in a time slot if the difference between the measured signal strengths is considerable enough to produce an erroneous bit decision, and reduce, using the second determined weighting coefficient, in soft bit decision-making in the decoder, the significance of at least one symbol at an end of the burst the base station receives in a time slot if the difference between the measured signal strengths is considerable enough to produce an erroneous bit decision.

17. A base station receiver improving the quality of data transmission in cellular radio systems utilizing time division multiple access, the receiver comprising a processor configured to:

measure the strength of the signal the base station receives in at least two consecutive time slots, wherein the difference in signal strengths is considerable enough to produce an erroneous bit decision if the difference exceeds a determined threshold value, determine a weighting coefficient by comparing the strength of the signal the base station receives in a time slot with the strength of the signal the base station receives in a previous time slot, and reduce, using the determined weighting coefficient, in soft bit decision-making in a decoder, the significance of at least one symbol at a beginning of a burst the base station receives in a time slot if the difference between the measured signal strengths is considerable enough to produce an erroneous bit decision.

18. A base station receiver improving the quality of data transmission in cellular radio systems utilizing time division multiple access, the receiver comprising a processor configured to:

measure the strength of the signal the base station receives in at least two consecutive time slots, wherein the difference in signal strengths is considerable enough to produce an erroneous bit decision if the difference exceeds a determined threshold value, determine a weighting coefficient by comparing the strength of the signal the base station receives in a time slot with the strength of the signal the base station receives in a following time slot, and reduce, using the determined weighting coefficient, in soft bit decision-making in a decoder, the significance of at least one symbol at an end of a burst the base station receives in a time slot if the difference between the measured signal strengths is considerable enough to produce an erroneous bit decision.

19. A base station receiver as claimed in claim 16, 17 or 18, wherein the weighting coefficients are higher than 0 but lower than 1.

20. A base station receiver as claimed in claim 16, 17 or 18, wherein the strength of the signal received at the base station is determined using RSSI (Received Signal Strength Indicator) measurement.

21. A base station receiver as claimed in claim 16, 17 or 18, wherein the weighting coefficients have the same values for all symbols to be weighted in each time slot.

22. A base station receiver as claimed in claim 16, 17 or 18, wherein the weighting coefficients have different values for different symbols to be weighted in each time slot.

* * * * *